March 27, 1945. J. A. McCORMICK, JR 2,372,215
METHOD FOR SEPARATING GLASS SHEETS AND THE LIKE
Filed Nov. 29, 1941 2 Sheets-Sheet 1
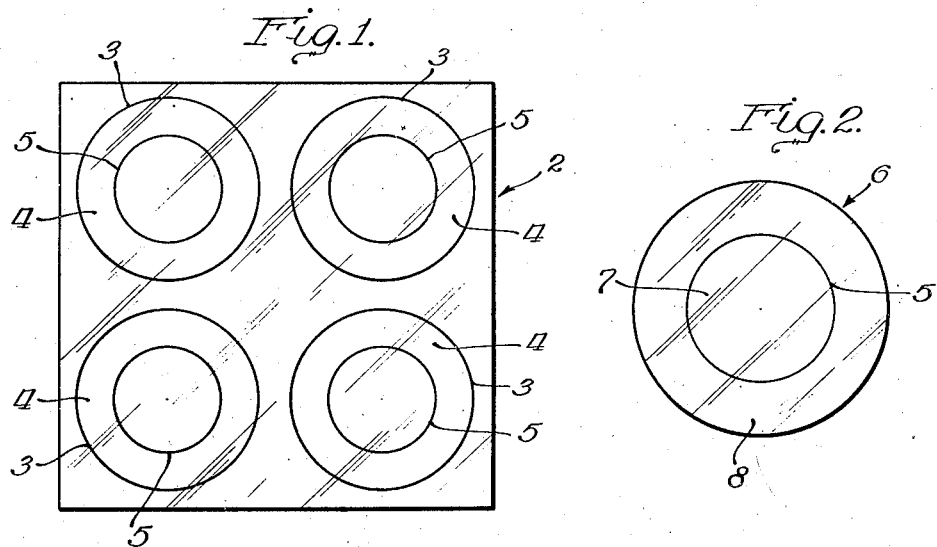
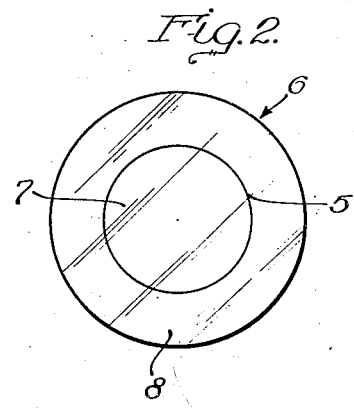
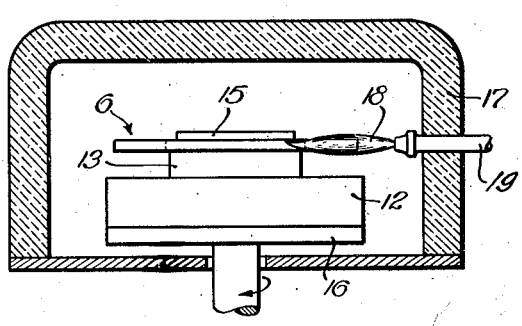
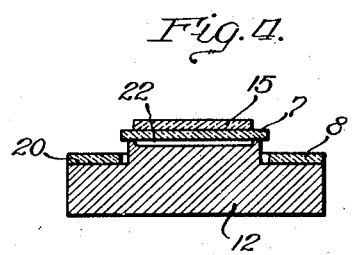
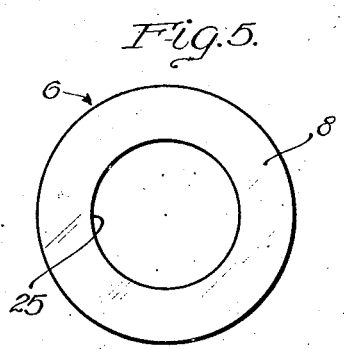
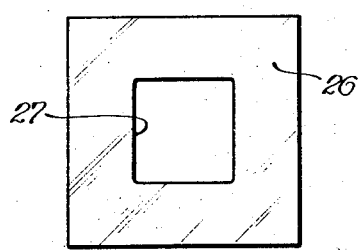
INVENTOR.
Joseph H. McCormick, Jr.

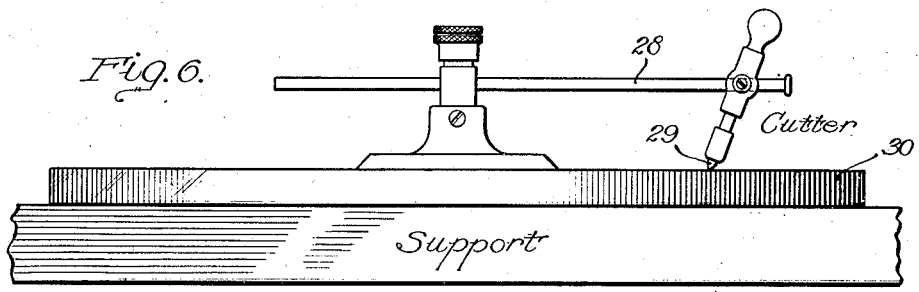
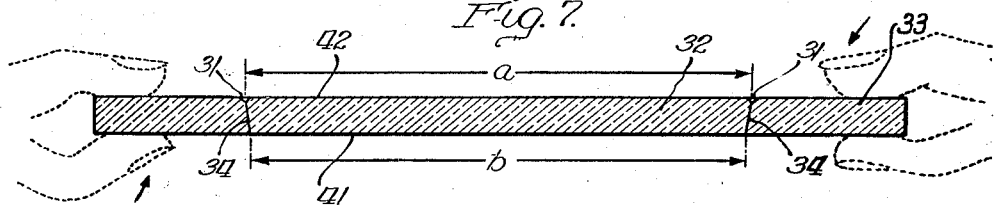
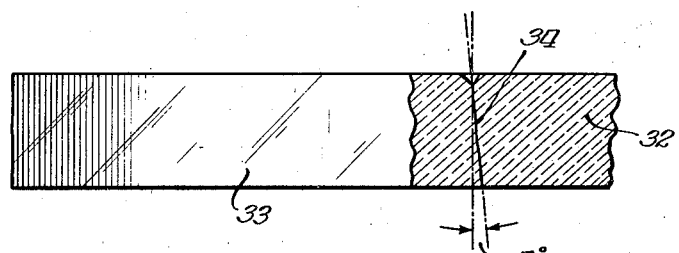
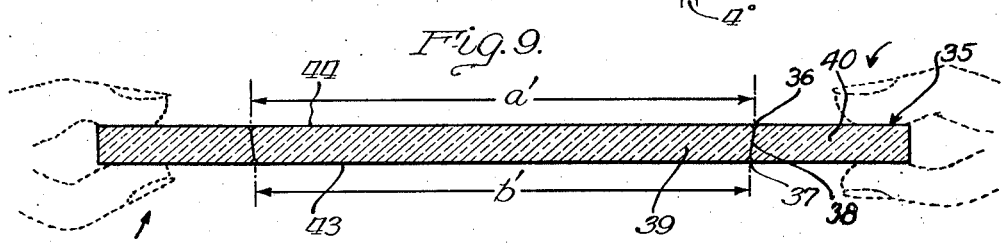
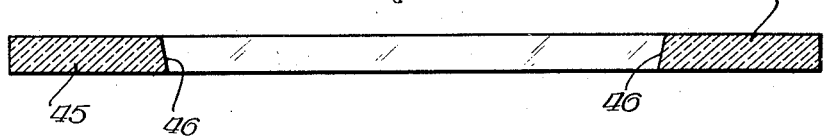

Patented Mar. 27, 1945

2,372,215

UNITED STATES PATENT OFFICE 2,372,215

METHOD FOR SEPARATING GLASS SHEETS AND THE LIKE

Joseph A. McCormick, Jr., Forest Park, Ill., assignor to Dearborn Glass Company, Chicago, Ill., a corporation of Illinois Application November 29, 1941, Serial No. 420,916

4 Claims. (Cl. 49—77)

My invention relates to a method of separating a sheet of glass or other vitreous material in two separate integral parts. More particularly, the present method is especially adapted for forming openings in sheets of glass or the like.

The present application is a continuation-in-part of my earlier application, Serial No. 362,809, filed October 25, 1940, now Patent No. 2,329,922, dated September 21, 1943.

It has long been the practice in the art to form openings in glass sheets by a grinding operation. This method is unsatisfactory for many reasons. For example, in grinding an opening the sheet must be turned over since it must be ground inwardly from both top and bottom surfaces to prevent chipping of the surfaces of the glass sheet adjacent the marginal edge defining the opening. Even if great care is exercised there nevertheless will be slight chipping of the glass surfaces. Grinding, at best, is a slow and expensive process. The marginal edge defining the opening will be roughened and if the glass sheet is to be used for decorative purposes in which this edge is exposed, a polishing operation is necessary. It has been my experience that this method is not economically feasible from a manufacturing standpoint. In addition this method lends itself only to the formation of circular openings.

It is an object of my invention to provide a method for readily separating a glass sheet into two integral portions, in which one portion of the glass sheet initially is substantially included within or surrounded by the other portion of the sheet.

A further object is to provide a method for readily forming openings of any desired configuration in glass sheets and the like.

A further object is to form an opening in a glass sheet or the like so that the surfaces of the sheet are not marred or the marginal edge defining the opening discolored.

A further object is the provision of a method which is adaptable for quantitative production and with which there is substantially no breakage of glass.

In order to attain the above objects, I propose to score, in outline, the configuration of the opening desired upon one surface of the glass sheet by means of a suitable glass cutter. The glass sheet is then preferably flexed slightly by hand to produce a fracture along the line of the score between the portion inside of the scoring which is to be removed to form the opening, and the remainder of the glass sheet. I have found that by then heating the portion of the glass outside of the scoring to expand it while maintaining the portion of the glass inside the scoring relatively cool, the two portions may be readily separated to form in the sheet an opening with clear sharp edges. Production of the fracture in advance of heating is not absolutely essential in practicing my invention.

Now, it will appear that since the sheet can be readily separated into two separate integral portions either of the portions may constitute the product. Thus, the invention is adaptable for forming glass sheets of intricate contour in which the portion within the score line constitutes the product, or if desired, the outer portion may constitute the product. In either case, shattering of either portion of the glass sheet is avoided.

In lieu of the above referred to method of carrying out my invention, I have found that even more satisfactory results may be attained if the sheet is scored so that upon flexing thereof a tapered fracture defines the inside and outside portions of the sheet. If the glass sheet is scored, for example, to provide a circular opening in the sheet, the portion within the score line will be substantially frusto-conical, then by supporting the sheet in a suitable heating means with the small diameter end of the frusto-conical inner portion disposed downwardly and expanding the outer portion at a faster rate than the inner portion, the portions will more readily separate from each other than in the first referred to method. The tapered fracture referred to may be readily accomplished by disposing the cutting edge of the scoring tool at a slight angle to the surface during the scoring and then subsequently flexing the sheet. It will be obvious that, if desired, both surfaces of the glass sheet may be scored with the projection of the scoring of the plane of one surface lying parallel with the scoring of the plane of the other surface so that upon flexing of the sheet a tapered fracture will extend through the thickness of the sheet.

So far as I am aware the principle of effecting separation of a glass sheet along a line scored upon the sheet by causing a relative change in dimensions between the portions defined by the scoring is broadly new. It will be understood that the application of the principle to a glass sheet is illustrative and not limiting, since the method disclosed may be adaptable for use with materials other than glass.

Now in order to acquaint those skilled in the art with the manner of utilizing my invention, I shall disclose in conjunction with the accompanying drawings a specific embodiment of the same.

In the drawings:

Figure 1 is a plan view of a sheet of glass stock which has been scored to provide a number of small circular sheets upon each of which the outline of an opening to be formed therein have also been scored;

Figure 2 is a plan view of one of the smaller circular sheets of Figure 1;

Figure 3 is a side elevational view of one suitable means for supporting the circular sheet of Figure 2 in a furnace, the furnace being shown in section and somewhat diagrammatically;

Figure 4 is a sectional view of the supporting means of Figure 3 and showing in section, the inner and outer portions of the circular glass sheet separated from each other;

Figure 5 is a plan view of the circular sheet of glass with an opening formed therein;

Figure 6 is a diagrammatic side elevation of a glass sheet being scored to produce a tapered fracture;

Figure 7 is a cross-sectional view of the glass sheet of Figure 6 after it has been scored and flexed;

Figure 8 is an enlarged view of a portion of the glass sheet of Figure 7 to more clearly illustrate the tapered line of fracture;

Figure 9 is a cross-sectional view of a glass sheet which has been scored on both surfaces and flexed to cause the tapered fracture;

Figure 10 is a sectional view through a glass sheet which has been scored in the manner shown in Figures 7 or 9 and after the inner portion of the sheet has been removed; and Figure 11 is a plan view of a substantially square sheet having a substantially square opening which may be formed by the method and apparatus of the present invention.

Referring now to Figure 1, I have shown a sheet of flat glass stock 2 which has been scored, at 3, by means of a suitable glass cutter to outline a number of small circular glass sheets 4, which have been scored at 5 to outline the openings to be formed therein. The glass sheet 2 is preferably flexed slightly by hand to fracture the sheet along the score lines 3 and 5. The circular sheet 6 of Figure 2 is obtained by breaking away the glass sheet 2 outside of scoring 3. I have chosen to illustrate and describe the formation of a circular opening in a circular glass sheet, but it will be understood that the sheet and opening may be of any configuration desired. In the present embodiment the circular glass sheet 6 is to be used as a dial for a clock mounted in the dashboard of an automobile.

I have found that the core portion 7 of the glass sheet 6, i. e., the portion of the sheet inside of the scoring 5 may be separated from the outer ring portion 8, or the portion of the sheet outside the scoring, by causing a relative change in dimensions between the portions. For example, if the outer ring portion 8 is heated to expand it while the core portion 7 is maintained at a relatively lower temperature, the portions 7 and 8 will separate from each other along the scoring 5. I have found that if the circular sheet 6 is fractured along scoring 5 separation of portions 7 and 8 from each other is more readily effected. Alternatively, if desired, the core portion 7 may be caused to contract by lowering the temperature thereof while maintaining the temperature of the ring portion 8 substantially constant as by applying a cold metallic plate or body to the portion 7, or still further, the core portion 7 and ring portion 8 may be simultaneously contracted and expanded, respectively, in practicing my invention. By utilizing the above principle, of change of size by thermal contraction or expansion, I have formed openings in glass sheets which are exceedingly well defined and in which there is no roughening or discoloration of the marginal edges defining the openings or chipping of the surfaces of the glass sheets adjacent the openings. The simplicity of this method adapts itself to mass production at a low cost. By proper control of the temperature to which the glass is subjected breakage of the glass and warpage thereof is completely eliminated.

In Figure 6 I have shown somewhat digrammatically a scoring tool 28 having a diamond point 29, the axis of the tool and its cutting edge being inclined from the perpendicular with respect to the plane of the glass sheet 30. The diamond cutter 28 is suitably supported so that it may be manipulated to define a score line 31 defining a core portion 32 within the score line, and an outer portion 33 outwardly of the score line, as shown in Figure 7. It will be understood that the inclined position of the diamond point 28 and the score line formed thereby as shown at 31 in Figure 8 are greatly enlarged for purposes of illustration since in practice the scoring extends only very slightly into the glass sheet. If the axis of the cutting edge or diamond point of the cutting tool 28 is inclined from the perpendicular with respect to the surface of the sheet 30, subsequent flexing of the sheet, as by grasping opposite marginal edges of the sheet by the hands and exerting force in opposed directions as illustrated in Figure 7, will cause the sheet to fracture along a taper 34 as diagrammatically shown in the drawings. In Figure 7 it will be seen that the diameter of the circular scoring on the upper surface of the sheet, indicated by the reference letter $a$, is slightly greater than the diameter of the circular fracture upon the bottom surface of the sheet, as indicated by the reference letter $b$.

Alternatively, if desired, and especially for use with thicker sheets of glass, I propose to cause a tapered fracture by scoring one surface of the glass sheet 35 of Figure 9, as at 36 with a suitable scoring tool to define a circular score line of a diameter $a'$. The sheet is then turned over and the other surface is scored, as at 37, in a suitable manner so this circular score line is of a diameter $b'$, in which diameter $b'$ is somewhat less than the diameter $a'$. Now if the sheet is grasped and slightly flexed as shown in Figure 9 in the manner described above in connection with Figure 7, a fracture or run will extend from the score line 36 to the score line 37 to produce a tapered fracture 38. When it is desired to treat a sheet of double strength glass, i. e., of from 115 to 140 thousandths of an inch thick, I have found that subsequent separation of the inner and outer portions 39 and 40, respectively, of Figure 9, and the inner and outer portions 32 and 33, respectively, of Figure 7, from each other may be readily attained if the sheets are suitably scored so that diameters $b$ and $b'$ are of approximately .016 of an inch less than the diameters $a$ and $a'$ respectively, of the sheets of these figures so that the taper is substantially at an angle of approximately 4°, as indicated in Figure 8. The angle of the fracture may, however, be larger or smaller and satisfactory separation is secured if the angle is within the range of 3° to 10°.

In Figures 3 and 4, I have shown an apparatus suitable for carrying out the practice of the method invention. A metal block 12 is provided with an upwardly extending annular projection 13 upon which the core portion 7 of the circular glass sheet 6 is seated. The diameter of the annular projection 13 preferably is substantially the same as or slightly less than the diameter of the core portion 7. A piece of heat insulating material 15, such as asbestos, is disposed upon the upper surface of the core portion 7. The block member 12 is then preferably placed upon a rotatable platform member 16 in a furnace 17. The glass sheet should preferably be pre-heated before the outer ring portion 8 is brought into direct contact with the flame 18 issuing from the burner 19 since application of a direct flame might break the sheet. The furnace 17 may be designed to readily effect pre-heating of the glass sheet or other means may be employed, as desired. Rotation of the glass sheet in the flame 18 gradually increases the temperature of the outer ring portion 8 to a greater extent than that of core portion 7. If desired, a plurality of gas burners may be employed for heating the furnace and the ring portion 8.

The insulating material 15 shields the core portion 7 from the flame 18, and the annular projection 13, by conduction, serves to maintain the core portion at a lower temperature than the ring portion 8. As the ring portion 8 is heated it will expand and finally drop away from the core portion 7, and be received by the annular seat 20 of the block 12.

After the portions 7 and 8 have been separated from each other, the block 12 is removed from the furnace and the separated glass pieces removed therefrom, after which another circular glass sheet 6 may be positioned upon the projection 13 and inserted in the furnace to repeat the operation. The rotation of the sheet past the flame is not essential. It is merely a suitable way of getting the outer portion 8 heated up rapidly and fairly evenly.

I have found that it is preferable to form an annular recess 22 in the face of the projection 13 to provide a minimum area of contact between it and the core portion 7 of the glass sheet so that when a glass sheet at room temperature is placed upon the heated block 12, the core portion will not expand the sheet and break it before the temperature of the outer ring portion 8 can be raised to an appropriate degree and the proper temperature differential established between portions 7 and 8 of the sheet. Alternate means for causing separation of the two portions may be readily devised in which the outer ring portion 8 supports the glass sheet and upon creating a difference in temperature of the portions 7 and 8, the core portion 7 will drop away from the supported sheet.

In Figure 5 the glass sheet 6 is shown having an opening 25 formed therein by the above described method and apparatus.

The apparatus of Figure 3 is equally applicable to separating the sheets of Figures 7 and 9 into two parts. In Figure 7 the core portion 32 is adapted to be disposed on the annular projection 13 with the surface 41 within the score on the sheet in contact with the projection. The insulating material 15 is disposed upon the surface 42 of the sheet within the score and upon disposing the sheet in a suitable furnace the outer portion 33 will be expanded at a faster rate than the inner portion 32 and they will readily separate from each other.

The fractured glass sheet of Figure 9 may be separated in the same manner as the sheets of Figures 2 and 7 by disposing the surface 43 within the score of the sheet 35 upon the annular projection 13, placing insulating material 15 upon the upper surface 44 within the score and then thermally expanding the outer portion 40 at a faster rate than the inner portion 39. In the glass sheets of Figures 7 and 9, separation is facilitated by reason of the tapered fracture, since upon slight expansion of the outer portions of the sheets they will readily drop away from the inner portions of the sheets. Glass known in the trade as 16 oz. glass and of thickness of 60 to 83 thousandths of an inch may be readily separated when scored and fractured, as described, by disposing the sheet in an oven at a temperature of approximately 1000° F. for about 1 min. and 10 sec. A sheet of single strength glass, i. e., of 83 to 103 thousandths of an inch in thickness may be separated in two integral portions in approximately one min. and 30 sec. at an oven temperature of 1000° F. In practicing the method with double strength glass, i. e., of approximately 110 to 140 thousands of an inch in thickness, I have found that an oven temperature of approximately 1000° F. the glass sheet is separated in approximately 1 min. 45 sec. In all of the above referred to specific preferred examples of my invention it is estimated that the portion of the glass sheet surrounding the score line attains a temperature of approximately 175 to 200° F. It will be understood that these examples are given merely as illustrative since it is believed that a wide variation may be made between oven temperatures and in the length of time required to attain the separation without departing from the broader concepts of my invention.

The method of causing the tapered fracture is preferred since it facilitates separation of the two portions from each other in less time and with substantially no breakage of glass. The tapered fracture method disclosed is particularly suitable for the thicker glass sheets such as double strength glass which is of the order of an eighth of an inch in thickness.

In Figure 10, there is shown a glass sheet 45 having an opening 46 formed therein by the methods as described in connection with either Figures 7 or 9. The resultant tapered edge defining the opening 46 is not readily discernible and for all practical purposes is unobjectionable. Preferably, however, where glass sheets having openings are to be used for decorative purposes, the scoring should be controlled so that the angle of taper of the edge does not exceed substantially 10°. It will be obvious, however, that if a distinct visible taper is desired that may be accomplished by creating a large difference in diameter between the dimensions $a$ and $a'$ and $b$ and $b'$ respectively, of Figures 7 and 9.

It will be apparent that the invention may be practiced to form openings of any desired configuration, and in Figure 11 I have shown a square sheet of glass 26 having a square opening 27 formed therein by my above described method.

Heat may be extracted from the inner portions at the same time that heat is added to the outer portions if desired. The whole sheet may be heated and the center cooled or the whole sheet may be cooled and the outside portions heated as may be desired. The methods and apparatus which I have above described are preferred in the practice of the invention.

Obviously, if desired, the above methods and apparatus may be employed for forming glass sheets of intricate contour, in which event the portion within the score line comprises the product.

While I have described the method of the present invention in connection with flat sheet glass, it will be readily obvious to those skilled in the art that my method is readily adaptable for forming openings in curved sheets of glass.

I claim:

1. The method of separating an outer part of a glass sheet or the like from an inner part thereof which is substantially included within the outer part, comprising positioning a scoring tool with the axis of its cutting edge inclined from the perpendicular with respect to the plane of said sheet, scoring the sheet with the tool as positioned to define said inner part along lines extending through and converging inwardly of said sheet from one of the surfaces thereof, flexing said sheet to fracture the same along the scoring whereby the juxtaposed edges of said parts after fracture will be tapered, and thermally expanding said outer part at a faster rate than said inner part to separate the parts from each other along the fracture.

2. The method of separating an outer part of a glass sheet or the like from an inner part thereof which is substantially included within the outer part, comprising positioning a scoring tool with the axis of its cutting edge inclined from the perpendicular with respect to the plane of said sheet, scoring the sheet with the tool so positioned to define said inner part along lines extending through and converging inwardly of said sheet from one of the surfaces thereof, flexing said sheet to fracture the same along the scoring whereby the juxtaposed edges of said parts after fracture will be tapered, supporting said sheet through the support of one of said parts, and thermally expanding said outer part at a faster rate than said inner part to separate the parts from each other along the fracture whereby the unsupported part will fall away from the supported part.

3. The method of separating an outer part of a glass sheet or the like from an inner part thereof which is substantially included within the outer part comprising positioning a scoring tool with the axis of its cutting edge inclined from the perpendicular with respect to the plane of said sheet, scoring the sheet with the tool so positioned to define said inner part along lines extending through and converging inwardly of said sheet from one surface thereof whereby the juxtaposed edges of said parts after fracture will be tapered, and creating a temperature difference in said parts to effect a change in the dimensions thereof to separate the parts from each other.

4. The method of separating an outer part of a glass sheet or the like from an inner part thereof which is substantially included within the outer part comprising positioning a scoring tool with the axis of its cutting edge inclined from the perpendicular with respect to the plane of said sheet, scoring the sheet with the tool so positioned to define said inner part along lines extending through and converging inwardly of said sheet from one of the surfaces thereof whereby the juxtaposed edges of said parts after fracture will be tapered, and thermally expanding said outer part more than said inner part to separate the same.

JOSEPH A. McCORMICK, Jr.